(12) United States Patent
Qi et al.

(10) Patent No.: US 11,886,993 B2
(45) Date of Patent: Jan. 30, 2024

(54) METHOD AND APPARATUS FOR TASK SCHEDULING BASED ON DEEP REINFORCEMENT LEARNING, AND DEVICE

(71) Applicant: Beijing University of Posts and Telecommunications, Beijing (CN)

(72) Inventors: Qi Qi, Beijing (CN); Haifeng Sun, Beijing (CN); Jing Wang, Beijing (CN); Lingxin Zhang, Beijing (CN); Jingyu Wang, Beijing (CN); Jianxin Liao, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 752 days.

(21) Appl. No.: 17/015,269

(22) Filed: Sep. 9, 2020

(65) Prior Publication Data

US 2021/0081787 A1 Mar. 18, 2021

(30) Foreign Application Priority Data

Sep. 12, 2019 (CN) .......................... 201910864432.X

(51) Int. Cl.
*G06N 3/08* (2023.01)
*G06N 3/047* (2023.01)
(52) U.S. Cl.
CPC ............... *G06N 3/08* (2013.01); *G06N 3/047* (2023.01)

(58) Field of Classification Search
CPC ................................ G06N 3/08; G06N 3/047
See application file for complete search history.

(56) References Cited

PUBLICATIONS

Lee et al. ("Poster Abstract: Deep Reinforcement Learning-based Resource Allocation in Vehicular Fog Computing," 2019 IEEE INFOCOM Poster, May 2019, pp. 1029-1030) (Year: 2019).*
Dai et al. ("Artificial Intelligence Empowered Edge Computing and Caching for Internet of Vehicles", Artificial Intelligence for Cognitive Wireless Communications, Jun. 2019, pp. 12-18) (Year: 2019).*

(Continued)

*Primary Examiner* — Miranda M Huang
*Assistant Examiner* — Robert Lewis Kulp
(74) *Attorney, Agent, or Firm* — PATENT PORTFOLIO BUILDERS PLLC

(57) ABSTRACT

Disclosed are a method and apparatus for task scheduling based on deep reinforcement learning and a device. The method comprises: obtaining multiple target subtasks to be scheduled; building target state data corresponding to the multiple target subtasks, wherein the target state data comprises a first set, a second set, a third set, and a fourth set; inputting the target state data into a pre-trained task scheduling model, to obtain a scheduling result of each target subtask; wherein the scheduling result of each target subtask comprises a probability that the target subtask is scheduled to each target node; for each target subtask, determining a target node to which the target subtask is to be scheduled based on the scheduling result of the target subtask, and scheduling the target subtask to the determined target node.

5 Claims, 3 Drawing Sheets

(56) References Cited

PUBLICATIONS

Hernandez-Leal et al. ("Agent Modeling as Auxiliary Task for Deep Reinforcement Learning", https://arxiv.org/pdf/1907.09597.pdf, arXiv:1907.09597v1 [cs.MA] Jul. 22, 2019, pp. 1-8) (Year: 2019).*
Joakim Bergdahl ("Asynchronous Advantage Actor-Critic with Adam Optimization and a Layer Normalized Recurrent Network," Royal Institute of Technology, School of Engineering Sciences, 2017, pp. 1-47) (Year: 2017).*

* cited by examiner

METHOD AND APPARATUS FOR TASK SCHEDULING BASED ON DEEP REINFORCEMENT LEARNING, AND DEVICE

The present application claims the priority to a Chinese patent present application No. 201910864432.X, filed with the China National Intellectual Property Administration on Sep. 12, 2019 and entitled "Multi-task reinforcement learning method for implementing parallel task scheduling", which is incorporated herein by reference in its entirety.

TECHNICAL FIELD

The present application relates to the field of deep learning, and in particular to a method and apparatus for task scheduling based on deep reinforcement learning and a device.

BACKGROUND

In the era of data explosion, distribution and parallelization has become an effective way of data processing. Cloud computing, fog computing, edge computing and so on are typical distributed and parallel computing environments for big data processing. Computing resources of these computing systems are limited, so the reasonable allocation of the computing resources is always a crucial research topic. In addition, sustainable development has become a global focus in recent years. However, power consumption of computing centers may cause huge energy losses. For all these reasons, in a complex dynamic network environment, it is a key problem for scholars around the world to schedule tasks to effectively utilize distributed resources, realize load balancing of computing systems, reduce power consumption and ensure quality of service (QoS).

In the field of automatic driving, most automatic driving functions, such as automatic navigation and collision avoidance, rely on the sensing of the surrounding environment. Therefore, each automatic driving vehicle is equipped with a large number of cameras and sensors to obtain environmental information. In addition, an automatic driving vehicle also needs to obtain relevant location and environmental information sensed by other vehicles around the automatic driving vehicle, so that driving decisions can be made timely to avoid traffic congestion and potential safety hazards.

Considering that it is very difficult for a single vehicle to analyze and process massive data collected by various vehicles, a cloud computing center is created. Although the cloud computing center has a strong computing capability, the centralized processing of all data in one cloud computing center will result in high communication cost. Moreover, for automatic driving, one second delay in automatic driving will lead to serious traffic accidents. In view of this, with the development of Internet of Things and in-vehicle Ad Hoc network (VANET), a special mobile Ad Hoc network, which is called Internet of vehicles (IoV), can be built by vehicles and other devices, such as base station (BS), road side unit (RSU) and other computing nodes with server level computing capacity. The computing resources are contributed by complex real-time tasks of nodes in IoV.

In general, a data processing task about the vehicle can be divided into multiple parallel subtasks. Therefore, how to schedule each subtask so as to ensure the processing efficiency of data processing task while taking into account the reasonable utilization of network resources in the Internet of vehicles is an urgent problem to be solved.

SUMMARY

The purpose of the present application is to provide a method and apparatus for task scheduling based on deep reinforcement learning and a device, so as to ensure the processing efficiency of data processing tasks while taking into account the reasonable utilization of network resources in the Internet of Vehicles. The specific technical solutions are as follows.

In a first aspect, an embodiment of the present application provides a method for task scheduling based on deep reinforcement learning, comprising:

obtaining multiple target subtasks to be scheduled; wherein, the multiple target subtasks are subtasks obtained by performing subtask division processing on a target task, which is a to-be-executed data processing task for a target vehicle;

building target state data corresponding to the multiple target subtasks, wherein the target state data comprises a first set, a second set, a third set, and a fourth set; the first set represents the number of CPUs required when each of the target subtasks is executed, the second set represents a data amount and storage location of data required when each of the target subtasks is executed, the third set represents current remaining execution time of an assigned task in each of target nodes, and the fourth set represents a CPU clock frequency of each of the target nodes; the target nodes are nodes for executing the target task in Internet of Vehicles;

inputting the target state data into a pre-trained task scheduling model, to obtain a scheduling result of each of the target subtasks; wherein, the scheduling result of each of the target subtasks comprises a probability that the target subtask is scheduled to each of the target nodes; and for each of the target subtasks, determining a target node to which the target subtask is to be scheduled based on the scheduling result of the target subtask, and scheduling the target subtask to the determined target node; wherein, the task scheduling model is a model obtained by training a preset deep neural network through training samples; the training samples comprise sample state data and decision actions corresponding to multiple sample subtasks; the multiple sample subtasks are subtasks obtained by performing the subtask division processing on a sample task related to a vehicle(s) that has been executed; each of the decision actions is an action corresponding to each of the sample subtasks during execution; the action corresponding to each of the sample subtasks is to schedule this sample subtask to a sample node, which is a node for executing the sample task in the Internet of Vehicles.

Optionally, the deep neural network is a network using an Asynchronous Advantage Actor-Critic (A3C) algorithm.

A process of training the task scheduling model comprises:

acquiring actual scheduling data about the sample task when the sample task is executed at multiple target moments;

assigning values to a preset state space s and a preset action space a based on the acquired actual scheduling data, to obtain sample state data $S_t$ and decision actions $a_t$ corresponding to the multiple sample subtasks of the sample task at each of the target moments;

training the deep neural network by at least using the sample state data $S_t$, the decision actions $a_t$, a preset reward function and a preset loss function, to obtain the task scheduling model;

wherein, the state space $S=\{F_{task}, L, T, F_{node}\}$ $F_{task}$, L, T and $F_{node}$ are all sets; $F_{task}$ represents the number of CPUs required when each of the sample subtasks is executed, L represents a data amount and storage location of data required when each of the sample subtasks is executed, T represents remaining execution time of an assigned task in each of sample nodes, and $F_{node}$ represents a CPU clock frequency of each of the sample nodes; the action space a is a set comprising decision actions corresponding to the multiple sample subtasks;

wherein, the reward function is a function for setting a reward to minimize average execution time; the loss function is a function for calculating a stun of a first type of loss and a second type of loss; the first type of loss is an average loss of Actor networks, and the second type of loss is a loss of a Critic network.

Optionally, the deep neural network comprises an input layer, a shared sub-network and an output sub-network that are connected in series;

the sample state data is input into the input layer;
the shared sub-network comprises multiple fully connected layers connected in series;
the output sub-network comprises multiple first branch sub-networks and one second branch sub-network which are parallel sub-networks; each of the first branch sub-networks is used as one Actor network to predict a scheduling result of one sample subtask, and the second branch sub-network is used as a Critic network to calculate a reward value of the sample state data; and
each of the first branch sub-networks comprises at least one fully connected layer and one softmax output layer, and the second branch sub-network comprises at least one fully connected layer and one linear output layer.

Optionally, the reward function is:

$$r_t = T_{base} - T_{job}(s_t, a_t)$$

wherein, $r_t$ is a reward value in a state represented by the sample state data $S_t$, $T_{base}$ is a baseline of preset task execution time, and $T_{job}(S_t, a_t)$ is actual execution time of the sample task when the sample task is scheduled by the decision actions $a_t$ in the state represented by the sample state data $S_t$.

Optionally, the loss function is:

$$L(\theta_1, \theta_2, \ldots, \theta_i, \ldots, \theta_M, \theta_v) = (\Sigma_{i=1}^{M} L_{actor}(\theta_i))/M + L_{critic}(\theta_v)$$

wherein, $L(\theta_1, \theta_2, \ldots, \theta_i, \ldots, \theta_M, \theta_v)$ is a loss value of the deep neural network, M is the number of first branch sub-networks to be trained, $\theta_1, \theta_2, \ldots, \theta_i, \ldots, \theta_M$ are network parameters of M first branch sub-networks, $\theta_i$ is a network parameter of the i-th first branch sub-network, and $\theta_v$ is a network parameter of the second branch sub-network;

wherein $L_{actor}(\theta_i)$ is a loss function of the i-th first branch sub-network:

$$L_{actor}(\theta_i) = \log \pi_i(a_{t,i}|s_t;\theta_i)(R_t - V(s_t;\theta_v)) + \beta H(\pi_i(s_t;\theta_i))$$

wherein, $\pi_i(a_{t,i}|s_t; \theta_i)$ is a probability of outputting an action $a_{t,i}$ by the i-th first branch sub-network, $\pi_i(s_t; \theta_i)$ is a probability distribution of outputting actions by the i-th first branch sub-network $H(\pi_i(s_t; \theta_i))$ is an entropy of the probability distribution, β is a parameter for controlling an intensity of entropy regularization term, the action $a_{t,i}$ is an action corresponding to the i-th sample subtask in the decision actions $a_t$, and each of the actions outputted by the i-th first branch sub-network is an action of scheduling the i-th sample subtask to each of the sample nodes;

$H(\pi_i(s_t; \theta_i))$ is calculated by a formula:

$$H(\pi_i(s_t; \theta_i)) = -\sum_{j=1}^{N} p(a_{t,i}^j) \log(2, p(a_{t,i}^j))$$

wherein, $p(a_{t,i}^j)$ is a probability of outputting an action j by the i-th first branch sub-network at a moment t; N is the number of the sample nodes; and the action j is an action of scheduling the i-th sample subtask to a sample node j;

$L_{critic}(\theta_v)$ is the loss function of the second branch sub-network:

$$L_{critic}(\theta_v) = (R_t - V(s_t;\theta_v))^2$$

wherein $R_t$ is a cumulative reward of $a_t$, and $V(s_t; \theta_v)$ is a reward value output by the second branch sub-network, $R_t$ is calculated by a formula:

$$R_t = \sum_{k=0}^{\infty} \gamma^k r_{t+k}$$

$\gamma \in [0,1]$ is a preset discount factor, and $r_{t+k}$ is a reward value in the state represented by the sample state data $S_{t+k}$.

In a second aspect, an embodiment of the present application provides an apparatus for task scheduling based on deep reinforcement learning, comprising:

an obtaining module, configured for obtaining multiple target subtasks to be scheduled;
wherein, the multiple target subtasks are subtasks obtained by performing subtask division processing on a target task, which is a to-be-executed data processing task for a target vehicle;
a building module, configured for building target state data corresponding to the multiple target subtasks, wherein the target state data comprises a first set, a second set, a third set, and a fourth set; the first set represents the number of CPUs required when each of the target subtasks is executed, the second set represents a data amount and storage location of data required when each of the target subtasks is executed, the third set represents current remaining execution time of an assigned task in each of target nodes, and the fourth set represents a CPU clock frequency of each of target nodes; the target nodes are nodes for executing the target task in Internet of Vehicles;
a determining module, configured for inputting the target state data into a pre-trained task scheduling model, to obtain a scheduling result of each of the target subtasks; wherein, the scheduling result of each of the target subtasks comprises a probability that the target subtask is scheduled to each of the target nodes; and
a scheduling module, configured for, for each of the target subtasks, determining a target node to which the target subtask is to be scheduled based on the scheduling result of the target subtask, and scheduling the target subtask to the determined target node;

wherein, the task scheduling model is a model obtained by training a preset deep neural network through training samples; the training samples comprise sample state data and decision actions corresponding to multiple sample subtasks; the multiple sample subtasks are subtasks obtained by performing the subtask division processing on a sample task related to a vehicle(s) that has been executed; each of the decision actions is an action corresponding to each of the sample subtasks during execution; the action corresponding to each of the sample subtasks is to schedule this sample subtask to a sample node, which is a node for executing the sample task in the Internet of Vehicles.

Optionally, the deep neural network is a network using an Asynchronous Advantage Actor-Critic (A3C) algorithm;

the task scheduling model is obtained by a training module configured for:

acquiring actual scheduling data about the sample task when the sample task is executed at multiple target moments;

assigning values to a preset state space s and a preset action space a based on the acquired actual scheduling data, to obtain sample state data $S_t$ and decision actions $a_t$ corresponding to the multiple sample subtasks of the sample task at each of the target moments;

training the deep neural network by at least using the sample state data $S_t$, the decision actions $a_t$, a preset reward function and a preset loss function, to obtain the task scheduling model;

wherein the state space $S=\{F_{task}, L, T, F_{node}\}$ $F_{task}$, L, T and $F_{node}$ are all sets; $F_{task}$ represents the number of CPUs required when each of the sample subtasks is executed, L represents a data amount and storage location of data required when each of the sample subtasks is executed, T represents remaining execution time of an assigned task in each of sample nodes, and $F_{node}$ represents a CPU clock frequency of each of the sample nodes; the action space a is a set comprising decision actions corresponding to the multiple sample subtasks;

wherein, the reward function is a function for setting a reward to minimize average execution time; the loss function is a function for calculating a sum of a first type of loss and a second type of loss; the first type of loss is an average loss of Actor networks, and the second type of loss is a loss of a Critic network.

Optionally, the deep neural network comprises an input layer, a shared sub-network and an output sub-network that are connected in series;

the sample state data is input into the input layer;

the shared sub-network comprises multiple fully connected layers connected in series;

the output sub-network comprises multiple first branch sub-networks and one second branch sub-network which are parallel sub-networks; each of the first branch sub-networks is used as one Actor network to predict a scheduling result of one sample subtask, and the second branch sub-network is used as a Critic network to calculate a reward value of the sample state data; and each of the first branch sub-networks comprises at least one fully connected layer and one softmax output layer, and the second branch sub-network comprises at least one fully connected layer and one linear output layer.

In a third aspect, an embodiment of the present application provides an electronic device comprising a processor, a communication interface, a memory and a communication bus, wherein the processor, the communication interface, and the memory communicate with each other via the communication bus;

the memory is configured for storing a computer program; and the processor is configured for performing the method provided in the first aspect when executing the program stored in the memory.

In a fourth aspect, an embodiment of the disclosure provides a computer-readable storage medium having a computer program stored thereon, wherein the computer program is executed by a processor, so as to cause the processor to perform the method provided in the first aspect.

Benefit Effect:

In the solution provided by the embodiment of the present application, a preset deep neural network is pre-trained by training samples to obtain a task scheduling model, which is a model that learns a task scheduling mode through training. After obtaining multiple target subtasks to be scheduled, target state data corresponding to the multiple target subtasks can be built and input into the task scheduling model, to obtain a scheduling result of each target subtask. The scheduling of each target subtask is completed based on the scheduling result of the target subtask. In this solution, since the training samples comprise sample state data and decision actions corresponding to multiple sample subtasks, the data on which the model training is based has the characteristic of the sample task and the characteristic of the sample node. In this way, the task scheduling mode learned by the task scheduling model takes into account the processing efficiency and the reasonable utilization of network resources. Therefore, this scheme can ensure the processing efficiency of data processing tasks while taking into account the reasonable utilization of network resources in the Internet of Vehicles.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other embodiments based on these drawings without any creative efforts.

DETAILED DESCRIPTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

Figure 1:
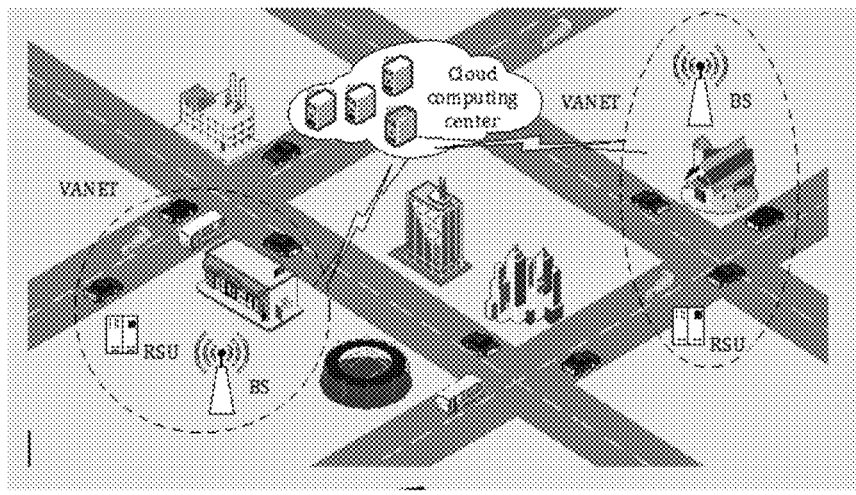
FIG. 1 is a diagram of a network system for Internet of Vehicles in an automatic driving scenario.

In order to facilitate understanding, a network system for Internet of Vehicles in an automatic driving scenario is introduced firstly. As shown in FIG. 1, the Internet of Vehicles (IoV), that is, a special mobile Ad Hoc network (VANET), may comprise vehicles and other devices, such as base station (BS), road side unit (RSU) and other computing nodes with server level computing capacity. In addition, each node in the Internet of Vehicles and a cloud computing center can collectively complete data processing tasks that match requests sent by vehicles.

In order to ensure the processing efficiency of data processing tasks while taking into account the reasonable utilization of network resources in the Internet of Vehicles, the embodiment of the present application provides a method and apparatus for task scheduling based on deep reinforcement learning, and a device.

The method for task scheduling based on deep reinforcement learning provided by an embodiment of the present application is introduced firstly below.

The method for task scheduling may be executed by a apparatus for task scheduling. The apparatus for task scheduling may run in a cloud data center, or a base station or a road side unit in the Internet of Vehicles. This is not limited herein.

Figure 2:
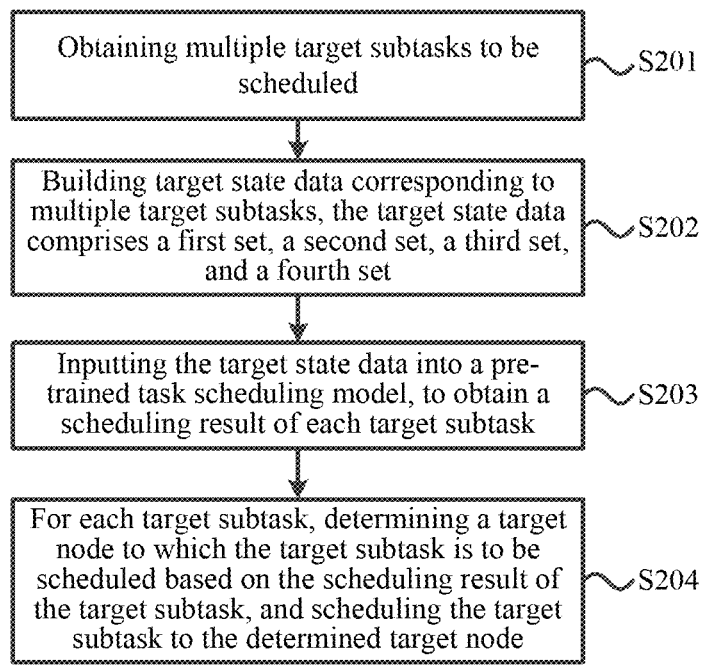
FIG. 2 is a flowchart of a method for task scheduling based on deep reinforcement learning according to an embodiment of the present application.

As shown in FIG. 2, an embodiment of the present application provides a method for task scheduling based on deep reinforcement learning, which may comprise the following steps.

S201, obtaining multiple target subtasks to be scheduled; wherein the multiple target subtasks are subtasks obtained by performing subtask division processing on a target task, which is a to-be-executed data processing task for a target vehicle.

In order to execute the target task, the target task may be divided into multiple target subtasks, and then the multiple target subtasks are scheduled, that is, the multiple target subtasks are allocated to target nodes for executing a task, so that the obtained target subtasks are processed by the target nodes.

It can be understood that when a data processing request sent by the vehicle is obtained, a data processing task corresponding to the data processing request, that is, the target task, can be generated. Specifically, the data processing request may be a navigation request, a collision avoidance request, and so on. Accordingly, the data processing task corresponding to the data processing request may be a navigation task, a collision avoidance task, and so on. In addition, on the premise that the divided target subtasks may be parallel tasks, the subtask division processing may be any processing mode in which a task can be divided into multiple subtasks. Since the division of a task into subtasks is not a focal point of the present application, the division is not specifically defined herein.

S202, building target state data corresponding to multiple target subtasks, wherein the target state data comprises: a first set, a second set, a third set, and a fourth set.

The first set represents the number of CPUs required when each target subtask is executed. The second set represents a data amount and a storage location of data required when each target subtask is executed. The third set represents current remaining execution time of an assigned task in each of target nodes. The fourth set represents a CPU clock frequency of each of the target nodes. The target nodes are nodes for executing the target task in the Internet of Vehicles.

Since the task scheduling is affected by the characteristic of each target subtask, such as task execution requirements, and the characteristic of each target node in the Internet of Vehicles, such as network resource conditions, in order to achieve the task scheduling, the target state data corresponding to multiple target subtasks to be scheduled can be built after obtaining the multiple target subtasks.

For example, data for building the first set can be obtained by pre-establishing a first corresponding relationship between the types of subtasks and the numbers of CPUs.

In this way, for each target subtask, the number of CPUs required when the target subtask is executed can be acquired based on the type of the target subtask and the first corresponding relationship.

For example, data for building the second set can be obtained by pre-establishing a second corresponding relationship between the types of subtasks, the storage locations and the data amounts of data required when the subtasks are executed.

In this way, for each target subtask, the storage location and data amount of data required when the target subtask is executed can be acquired based on the type of the target subtask and the second corresponding relationship.

The foregoing manners of obtaining data for building the first set and the second set are merely examples, and should not constitute a limitation to the embodiments of the present application.

The specific representations of the first set, the second set, the third set, and the fourth set are the same as representations of sets comprised in sample state data in training samples. Hereafter, the specific representations of the first set, the second set, the third set and the fourth set are explained in connection to the introduction of the training samples.

S203, inputting the target state data into a pre-trained task scheduling model, to obtain a scheduling result of each target subtask; wherein, the scheduling result of each target subtask comprises a probability that the target subtask is scheduled to each of the target nodes;

The task scheduling model is a model obtained by training a preset deep neural network based on training samples. The training samples comprise sample state data and decision actions corresponding to multiple sample subtasks. The multiple sample subtasks are subtasks obtained by performing the subtask division processing on a sample task related to a vehicle(s) that has been executed. Each of the decision actions is an action corresponding to each sample subtask during execution. The action corresponding to each sample subtask is to schedule the sample subtask to a sample node, which is a node for executing the sample task in the Internet of Vehicles.

In the embodiment of the present application, a preset deep neural network is pre-trained by training samples to obtain a task scheduling model. The task scheduling model is a model that learns a task scheduling mode through training. In this way, after obtaining target state data, the target state data can be input into the pre-trained task scheduling model, to obtain a scheduling result of each target subtask. It can be understood that each set in the target state data can be connected (i.e. combined) to obtain the connected data, and then the connected data can be input to the task scheduling model, so that the task scheduling model performs task scheduling analysis on the connected data.

The preset deep neural network may have multiple network structures. In order to make the scheme and the layout clear, the training process and network structure of the task scheduling model will be introduced exemplarily below.

S204, for each target subtask, determining a target node to which the target subtask is to be scheduled based on the scheduling result of the target subtask, and scheduling the target subtask to the determined target node.

A maximum probability in the scheduling result of each target subtask can be determined. A target node corresponding to the maximum probability is determined as the target node to which the target subtask is to be scheduled. The target subtask is scheduled to the determined target node, so that the processing of the target subtask is completed through the determined target node. It can be understood that after the processing of each target subtask is completed, the apparatus for task scheduling may organize processing results of each of target subtasks, so as to perform corresponding processing actions based on the organized content.

In the scheme provided by the embodiment of the present application, a preset deep neural network is pre-trained by training samples to obtain a task scheduling model. The task scheduling model is a model that learns a task scheduling mode through training. Furthermore, after obtaining multiple target subtasks to be scheduled, target state data corresponding to multiple target subtasks can be built and input into the task scheduling model, to obtain a scheduling result of each target subtask. Based on the scheduling result, the scheduling of each target subtask is completed. In this solution, since the training samples comprise sample state data corresponding to multiple sample subtasks and decision actions, the data on which the model training is based has the characteristic of the sample task and the characteristic of the sample node. In this way, the task scheduling mode learned by the task scheduling model can take into account the processing efficiency and the reasonable utilization of network resources. Therefore, this scheme can ensure the processing efficiency of data processing tasks while taking into account the reasonable utilization of network resources in the Internet of Vehicles.

In order to make the scheme clear, the training process of the task scheduling model will be introduced exemplarily below.

Figure 3:
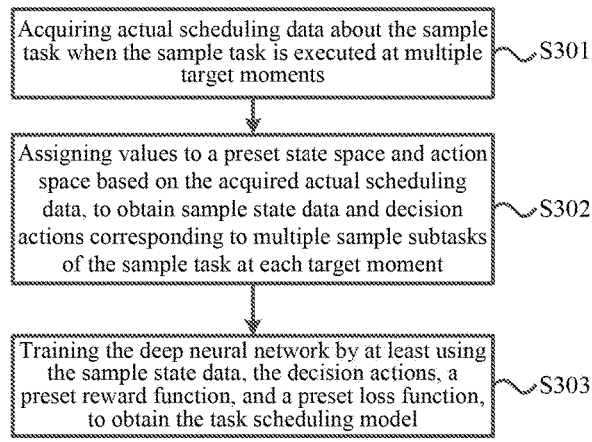
FIG. 3 is a flowchart of a training process of a task scheduling model according to an embodiment of the present application.

The deep neural network is a network using A3C (Asynchronous Advantage Actor-Critic) algorithm. As shown in FIG. 3, the training process of the task scheduling model may comprise the following steps.

S301, acquiring actual scheduling data about a sample task when the sample task is executed at multiple target moments.

There may be multiple sample tasks. The processing of each sample task is the same.

The actual scheduling data about the sample task comprises: a serial number of a sample node to which each sample subtask of the sample task is scheduled, the number of CPUs required and the storage location and data amount of data required when the sample task is executed, remaining execution time of an assigned task in the sample node when each sample subtask is scheduled, and a CPU clock frequency of each of sample nodes.

S302, assign values to a preset state space s and a preset action space a based on the acquired actual scheduling data to obtain sample state data $S_t$ and decision actions $a_t$ corresponding to multiple sample subtasks of the sample task at each target moment.

S303, training the deep neural network by at least using the sample state data $S_t$, the decision actions $a_t$, a preset reward function, and a preset loss function, to obtain the task scheduling model.

The state space $S=\{F_{task}, L, T, F_{node}\}$. $F_{task}, L, T, F_{node}$ are all sets. $F_{task}$ represents the number of CPUs required when each sample subtask is executed, L represents the data amount and storage location of data required when each target subtask is executed, T represents remaining execution time of the assigned task in each of the sample nodes, and $F_{node}$ represents a CPU clock frequency of each of the sample nodes. The action space a is a set comprising decision actions corresponding to multiple sample subtasks.

The reward function is a function for setting a reward to minimize average execution time. The loss function is a function for calculating a sum of a first type of loss and a second type of loss. The first type of loss is an average loss of Actor networks, and the second type of loss is a loss of a Critic network.

Before training the task scheduling model, the following settings are performed in advance.

(1) Setting a state space $S=\{F_{task}, L, T, F_{node}\}$. $F_{task}, L, T, F_{node}$ are all sets. $F_{task}$ represents the number of CPUs required when each sample subtask is executed, L represents the data amount and storage location of data required when each sample subtask is executed, T represents remaining execution time of the assigned task in each of the sample nodes, and $F_{node}$ represents a CPU clock frequency of each of the sample nodes.

$F_{task}$ may be $F_{task}=\{f_1, f_2, f_3, \ldots, f_M\}$, wherein, M is the maximum serial number of the target subtask, $f_1$ is the number of CPUs required when the first sample subtask is executed, $f_2$ is the number of CPUs required when the second sample subtask is executed, $f_3$ is the number of CPUs required when the third sample subtask is executed, and $f_M$ is the number of CPUs required when the Mth sample subtask is executed.

L may be $L=\{L_1, L_2, L_3, \ldots, L_i, \ldots, L_M\}$, wherein, $L_i$ represents the storage location and data amount of data required when the i-th sample subtask is executed. $L_i=\{l_1, l_2, l_3, \ldots, l_j, \ldots, l_M\}$, wherein N is the maximum serial number of the sample node. If the storage location of the data required when the i-th sample subtask is executed is a sample node j, the element is set to the data amount of the data required when the i-th sample subtask is executed, and other elements are set to zero.

T may be $T=\{t_1, t_2, t_3, \ldots, t_i, \ldots, t_N\}$, wherein $t_i$ is current remaining execution time of the assigned task in the i-th sample node.

$F_{node}$ may be $\{F_{node}^1, F_{node}^2, \ldots, F_{node}^i, \ldots, F_{node}^N\}$, wherein $F_{node}^i$ is a CPU clock frequency of the i-th sample node.

(2) Setting an action space a, which is a set comprising decision actions corresponding to multiple sample subtasks. The decision action represents an action corresponding to each sample subtask during execution, and the action corresponding to each sample subtask is to schedule the sample node to the sample subtask.

(3) Setting a reward function, which is a function for setting a reward to minimize average execution time.

(4) Setting a loss function, which is a function for calculating the sum of the first type of loss and the second type of loss. The first type of loss is an average loss of Actor networks, and the second type of loss is a loss of a Critic network.

After the state space, the action space, the reward function, and the loss function are set, a preset state space s and action space a can be assigned based on the obtained actual scheduling data, to obtain the sample state data. $S_t$ and decision actions $a_t$ corresponding to multiple sample sub-tasks of the sample task. The deep neural network may be trained by at least using the sample state data $S_t$, the decision actions $a_t$, the preset reward function and the preset loss function, to obtain the task scheduling model. It can be understood that the task scheduling model is obtained after the deep neural network converges.

In addition, considering that a decision action at any moment has an impact on the subsequent decisions, the deep neural network may be trained by using sample state data. $S_t$, decision actions $a_t$, the preset reward function, the preset loss function, and sample state data at each target moment after the target moment t corresponding to the sample state data $S_t$, in training the model. Specifically, using the sample state data at each target moment after the target moment t corresponding to the sample state data $S_t$ specifically refers to using a reward value of a state represented by the sample state data at each target moment, which is specifically described below with reference to the following formula of loss function.

It can be understood that in correspondence to the training samples described above, the specific forms of the first set, the second set, the third set, and the fourth set may be as follows.

The first set may be $F_0=\{f_1, f_2, f_3, \ldots, f_M\}$, wherein, M is the maximum serial number of the target subtask, $f_1$ is the number of CPUs required when the first target subtask is executed, $f_2$ is the number of CPUs required when the second target subtask is executed, $f_3$ is the number of CPUs required when the third target subtask is executed, and $f_M$ is the number of CPUs required when the Mth target subtask is executed.

The second set may be $L_0=\{L_1, L_2, L_3, \ldots, L_i, \ldots, L_M\}$, wherein, $L_i$ represents the storage location and data amount of data required when the i-th target subtask is executed. $L_i=\{l_1, l_2, l_3, \ldots, l_j, \ldots, l_M\}$, wherein N is the maximum serial number of the target node. If the storage location of the data required when the i-th sample subtask is executed is a sample node j, the element is set to the data amount of data required when the i-th sample subtask is executed, and other elements are set to zero.

The third set may be $T=\{t_1, t_2, t_3, \ldots, t_i, \ldots, t_N\}$, wherein $t_i$ is current remaining execution time of the assigned task in the i-th target node.

The fourth set may be $F_0=\{F_{node}^1, F_{node}^2, \ldots, F_{node}^i, \ldots, F_{node}^N\}$, $F_{node}^i$ is a CPU clock frequency of the i-th target node.

Through the above training process, a task scheduling model for task scheduling can be obtained.

In addition, the deep neural network may have multiple network structures. In one implementation, the deep neural network may comprise a input layer, a shared sub-network and an output sub-network which are connected in series.

The sample state data is input into the input layer.

The shared sub-network comprises multiple fully connected layers connected in series;

The output sub-network comprises multiple first branch sub-networks and one second branch sub-network which are parallel sub-networks; each of the first branch sub-networks is used as one Actor network to predict a scheduling result of one sample subtask, and the second branch sub-network is used as a Critic network to calculate a reward value of the sample state data, that is, a reward value in a state represented by the sample state data value.

The first branch sub-network comprises at least one fully connected layer and one softmax output layer, and the second branch sub-network comprises at least one fully connected layer and one linear output layer.

It can be understood that data obtained by connecting the sets in the sample state data may be input into the input layer. The input layer is used for obtaining an input and transferring the input to the shared sub-network. In addition, the shared sub-network is the fully connected neural network, and an output of the input layer is transformed by the shared sub-network as an input of the first branch sub-network and the second branch sub-network.

For example, the shared sub-network may comprise three fully connected layers. A first fully connected layer is composed of 128 nodes, a second fully connected layer is composed of 256 nodes, and a third fully connected layer is composed of 128 nodes.

For example, the first branch sub-network may comprise one fully connected layer, which may be composed of 64 nodes. The second branch sub-network may comprise one fully connected layer, which may be composed of 64 nodes.

Figure 4:
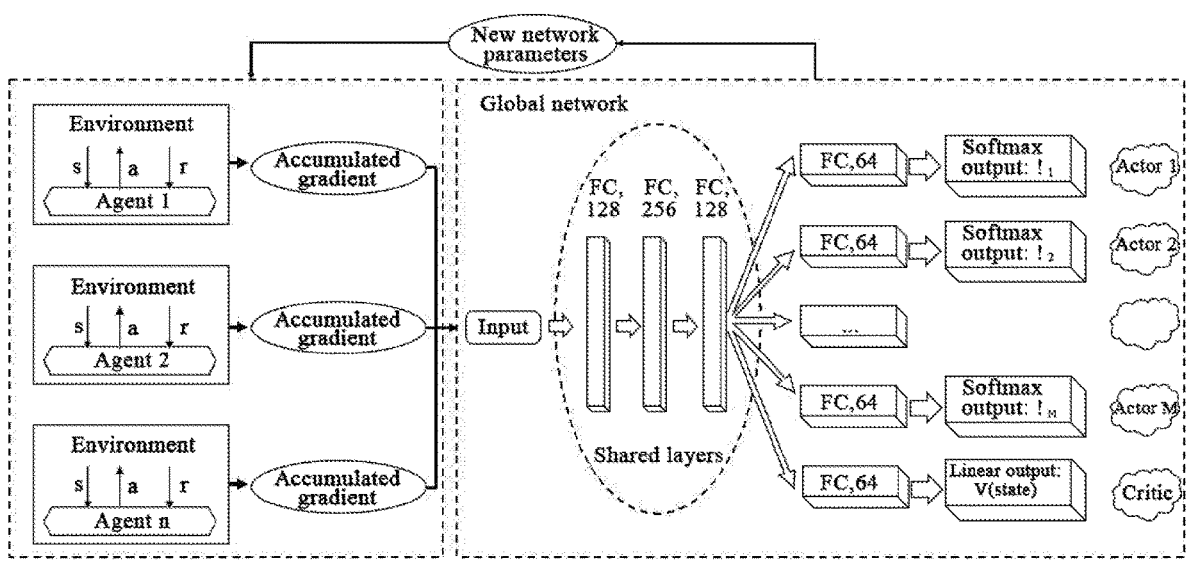
FIG. 4 is a diagram of a principle of training a deep neural network according to an embodiment of the present application.

In order to facilitate the understanding of the principle of training the deep neural network described above, FIG. 4 exemplarily shows a principle diagram of training a deep neural network. In FIG. 4, a structural diagram of a global network of the deep neural network is shown in the dashed box on the right. Specifically, the shared layers in the deep neural network comprise three fully connected layers (FC) composed of 128 nodes, and the output sub-network in the deep neural network comprises M first branch sub-networks and one second branch sub-network. Each first branch sub-network represents one Actor, and the second branch sub-network represents a Critic. Each first branch sub-network comprises one FC composed of 64 nodes, and one softmax output layer. The second branch sub-network comprises one FC composed of 64 nodes, and one linear output layer for calculating the reward value V (state) of the sample state data.

In the dashed box on the left in FIG. 4, Environment represents a scheduling environment, that is, a VANET network; Agent is an intelligent agent; s is state data of the scheduling environment; a is a scheduling plan output by the intelligent agent; r is a reward returned by the environment after utilizing the scheduling plan output by the intelligent agent; Accumulated gradients is a gradient calculation. The deep neural network is updated by a result of a gradient calculation of a certain Agent. After updating parameters, the deep neural network updates new neural network parameters to all Agents. It should be noted that Agent refers to a running instance of the task scheduling algorithm. The A3C algorithm involved in the present application is an asynchronous algorithm. Therefore, there may be multiple local algorithm instances (Agent1/Agent2/Agent3) running in different environments at the same time, and one global Agent. The global Agent keeps learning updated parameters of the local Agents 1/2/3, and sends the newest parameters learned from any one of the agents to other local Agents. After obtaining the newest parameters, the local agents continue to learn on the basis of the parameters. In this way, a generalization ability of the Agent (learning knowledge in various environments) can be ensured and the training time can be sped up.

Based on the network structure of the above deep neural network, for example, the reward function may be:

$$r_t = T_{base} - T_{job}(s_t, a_t)$$

wherein, $r_t$ is a reward value in a state represented by sample state data $S_t$, $T_{haw}$ is a baseline of preset task execution time, and $T_{job}(S_t, a_t)$ is actual execution time of the sample task when the sample task is scheduled by the decision actions $a_t$ in the state represented by the sample state data $S_t$.

For example, the loss function may be:

$$L(\theta_1, \theta_2, \ldots, \theta_i, \ldots, \theta_M, \theta_v) = (\Sigma_{i=1}^{M} L_{actor}(\theta_i))/M + L_{critic}(\theta_v)$$

wherein, $L(\theta_1, \theta_2, \ldots, \theta_i, \ldots, \theta_M, \theta_v)$ is a loss value of the deep neural network, M is the number of first branch sub-networks to be trained, $\theta_1, \theta_2, \ldots, \theta_i, \ldots, \theta_M$ are network parameters of Ni first branch sub-networks, $\theta_i$ is a network parameter of the i-th first branch sub-network, and $\theta_v$ is a network parameter of the second branch sub-network;

$L_{actor}(\theta_i)$ is a loss function of the i-th first branch sub-network:

$$L_{actor}(\theta_i) = \log \pi_i(a_{t,i}|s_t;\theta_i)(R_t - V(s_t;\theta_v)) + \beta H(\pi_i(s_t;\theta_i))$$

wherein, $\pi_i(a_{t,i}|s_t; \theta_i)$ is a probability of outputting an action $a_{t,i}$ by the i-th first branch sub-network, $\pi_i(s_t; \theta_i)$ is a probability distribution of outputting actions by the i-th first branch sub-network $H(\pi_i(s_t; \theta_i))$ is an entropy of the probability distribution, $\beta$ is a parameter for controlling an intensity of entropy regularization term, the action $a_{t,i}$ is an action corresponding to the i-th sample subtask in the decision actions $a_t$; each of the actions output by the i-th first branch sub-network is an action of scheduling the i-th sample subtask to each of the sample nodes.

$H(\pi_i(s_t; \theta_i))$ is calculated by the following formula:

$$H(\pi_i(s_t; \theta_i)) = -\sum_{j=1}^{N} p(a_{t,i}^j) \log(2, p(a_{t,i}^j))$$

wherein, $p(a_{t,i}^j)$ is a probability of outputting an action j by the i-th first branch sub-network at a moment t; N is the number of the sample nodes; and the action j is an action of scheduling the i-th sample subtask to sample node j;

$L_{critic}(\theta_v)$ is the loss function of the second branch sub-network:

$$L_{critic}(\theta_v) = (R_t - V(s_t;\theta_v))^2$$

$R_t$ is a cumulative reward of $a_t$, and $V(s_t; \theta_v)$ is a reward value output by the second branch sub-network.

$R_t$ is calculated by the following formula:

$$R_t = \sum_{k=0}^{\infty} \gamma^k r_{t+k}$$

$\gamma \in [0,1]$ is a preset discount factor, and $r_{t+k}$ is a reward value in the state represented by the sample state data $S_{t+k}$.

To sum up, in the scheme provided by the embodiment of the present application, a strategy function and a value function are represented by the deep neural network. That is, the Actor network is used for representing the strategy function, and the Critic network is used for representing the value function. Multiple Actor networks are provided for the separate scheduling of subtasks. Therefore, the deep neural network comprises multiple first branch sub-networks for representing the strategy function $\pi_i(a_{t,i}|s_t; \theta_i)$ and second branch sub-networks for representing the value function $V(s_t, \theta_v)$. In addition, each first branch sub-network and each second branch sub-network share multiple non-output layers. Each first branch sub-network comprises N output nodes, to show the probability distribution of allocating subtasks to server nodes.

Figure 5:
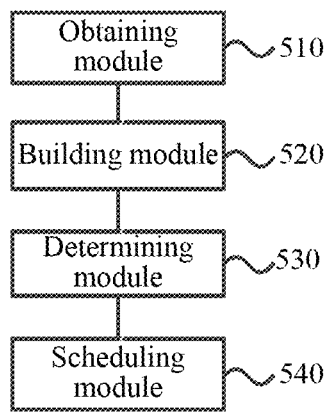
FIG. 5 is a structural diagram of a apparatus for task scheduling based on deep reinforcement learning according to an embodiment of the present application.

Corresponding to the above method embodiment, an embodiment of the present application further provides an apparatus for task scheduling based on deep reinforcement learning. As shown in FIG. 5, the apparatus for task scheduling may comprise an obtaining module 510, a building module 520, a determining module 530 and a scheduling module 540.

The obtaining module 510 is configured for obtaining multiple target subtasks to be scheduled; wherein, the multiple target subtasks are subtasks obtained by performing subtask division processing on a target task, which is a to-be-executed data processing task for a target vehicle.

The building module 520 is configured for building target state data corresponding to the multiple target subtasks, wherein the target state data comprises a first set, a second set, a third set, and a fourth set. The first set represents the number of CPUs required when each of the target subtasks is executed, the second set represents a data amount and storage location of data required when each of the target subtasks is executed, the third set represents current remaining execution time of an assigned task in each of target nodes, and the fourth set represents a CPU clock frequency of each of target nodes. The target nodes are nodes for executing the target task in Internet of Vehicles.

The determining module 530 is configured for inputting the target state data into a pre-trained task scheduling model, to obtain a scheduling result of each of the target subtasks; wherein, the scheduling result of each of the target subtasks comprises a probability that the target subtask is scheduled to each of the target nodes.

The scheduling module 540 is configured for, for each of the target subtasks, determining a target node to which the target subtask is to be scheduled based on the scheduling result of the target subtask, and scheduling the target subtask to the determined target node.

The task scheduling model is a model obtained by training a preset deep neural network through training samples. The training samples comprise sample state data and decision actions corresponding to multiple sample subtasks. The multiple sample subtasks are subtasks obtained by performing the subtask division processing on a sample task related to a vehicle(s) that has been executed. Each of the decision actions is an action corresponding to each of the sample subtasks during execution. The action corresponding to each of the sample subtasks is to schedule this sample subtask to a sample node, which is a node for executing the sample task in the Internet of Vehicles.

Optionally, the deep neural network is a network using an Asynchronous Advantage Actor-Critic (A3C) algorithm.

The task scheduling model is obtained by a training module configured for:

acquiring actual scheduling data about the sample task when the sample task is executed at multiple target moments;

assigning values to a preset state space s and a preset action space a based on the acquired actual scheduling data, to obtain sample state data $S_t$ and decision actions $a_t$ corresponding to the multiple sample subtasks of the sample task at each of the target moments; and training the deep neural network by at least using the sample state data $S_t$, the decision actions $a_t$, a preset reward function and a preset loss function, to obtain the task scheduling model;

wherein, the state space $S=\{F_{task}, L, T, F_{node}\}$ $F_{task}$, L, T and $F_{node}$ are all sets; $F_{task}$ represents the number of CPUs required when each of the sample subtasks is executed, L represents a data amount and storage location of data required when each of the sample subtasks is executed, T represents remaining execution time of an assigned task in each of sample nodes, and $F_{node}$ represents a CPU clock frequency of each of the sample nodes; the action space a is a set comprising decision actions corresponding to the multiple sample subtasks;

wherein, the reward function is a function for setting a reward to minimize average execution time; the loss function is a function for calculating a sum of a first type of loss and a second type of loss; the first type of loss is an average loss of Actor networks, and the second type of loss is a loss of a Critic network.

Optionally, the deep neural network comprises an input layer, a shared sub-network and an output sub-network that are connected in series.

The sample state data is input into the input layer.

The shared sub-network comprises multiple fully connected layers connected in series.

The output sub-network comprises multiple first branch sub-networks and one second branch sub-network which are parallel sub-networks; each of the first branch sub-networks is used as one Actor network to predict a scheduling result of one sample subtask, and the second branch sub-network is used as a Critic network to calculate a reward value of the sample state data.

Each of the first branch sub-networks comprises at least one fully connected layer and one softmax output layer, and the second branch sub-network comprises at least one fully connected layer and one linear output layer.

Optionally, the reward function is:

$$r_t T_{base} - T_{job}(S_t, a_t)$$

wherein, $r_t$ is a reward value in a state represented by the sample state data $S_t$, $T_{base}$ is a baseline of preset task execution time, and $T_{job}(S_t, a_t)$ is actual execution time of the sample task when the sample task is scheduled by the decision actions $a_t$ in the state represented by the sample state data $S_t$.

Optionally, the loss function is:

$$L(\theta_1, \theta_2, \ldots, \theta_i, \ldots, \theta_M, \theta_v) = (\Sigma_{i=1}^{M} L_{actor}(\theta_i))/M + L_{critic}(\theta_v)$$

wherein, $L(\theta_1, \theta_2, \ldots, \theta_i, \ldots, \theta_M, \theta_v)$ is a loss value of the deep neural network, M is the number of first branch sub-networks to be trained, $\theta_1, \theta_2, \ldots, \theta_i, \ldots, \theta_M$ are network parameters of M first branch sub-networks, $\theta_i$ is a network parameter of the i-th first branch sub-network, and $\theta_v$ is a network parameter of the second branch sub-network.

$L_{actor}(\theta_i)$ is a loss function of the i-th first branch sub-network:

$$L_{actor}(\theta_i) = \log \pi_i(a_{t,i}|s_t;\theta_i)(R_t - V(s_t;\theta_v)) + \beta H(\pi_i(s_t;\theta_i))$$

wherein, $\pi_i(a_{t,i}|s_t; \theta_i)$ is a probability of outputting an action $a_{t,i}$ by the i-th first branch sub-network, $\pi_i(s_t; \theta_i)$ is a probability distribution of outputting actions by the i-th first branch sub-network $H(\pi_i(s_t; \theta_i))$ is an entropy of the probability distribution, β is a parameter for controlling an intensity of entropy regularization term, the action $a_{t,i}$ is an action corresponding to the i-th sample subtask in the decision actions $a_t$, and each of the actions outputted by the i-th first branch sub-network is an action of scheduling the i-th sample subtask to each of the sample nodes.

$H(\pi_i(s_t; \theta_i))$ is calculated by a formula:

$$H(\pi_i(s_t; \theta_i)) = -\sum_{j=1}^{N} p(a_{t,i}^j)\log(2, p(a_{t,i}^j))$$

wherein, $p(a_{t,i}^j)$ is a probability of outputting an action j by the i-th first branch sub-network at a moment t; N is the number of the sample nodes; and the action j is an action of scheduling the i-th sample subtask to a sample node j.

$L_{critic}(\theta_v)$ is the loss function of the second branch sub-network:

$$L_{critic}(\theta_v) = (R_t - V(s_t;\theta_v))^2$$

wherein $R_t$ is a cumulative reward of $a_t$, and $V(s_t; \theta_v)$ is a reward value output by the second branch sub-network, $R_t$ is calculated by a formula:

$$R_t = \sum_{k=0}^{\infty} \gamma^k r_{t+k}$$

$\gamma \in [0,1]$ is a preset discount factor, and $r_{t+k}$ is a reward value in the state represented by the sample state data $S_{t+k}$.

Figure 6:
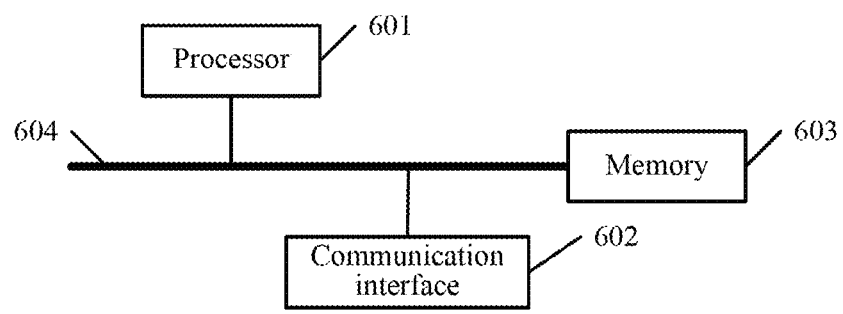
FIG. 6 is a structural diagram of an electronic device according to an embodiment of the present application.

Based on the above method embodiment, an embodiment of the present application further provides an electronic device, as shown in FIG. 6, which comprises a processor 601, a communication interface 602, a memory 603 and a communication bus 604. The processor 601, the communication interface 602, and the memory 603 communicate with each other via the communication bus 604.

The memory 603 is configured for storing a computer program.

The processor 601 is configured for performing the method for task scheduling based on deep reinforcement learning provided by the embodiment of the present application when executing the program stored in the memory 603.

The communication bus aforementioned in the electronic device may be a peripheral component interconnect (PCI) bus, an extended industry standard architecture (EISA) bus or the like. The communication bus can comprise an address bus, a data bus, a control bus, or the like. For the sake of description, only one thick line is shown in the figure, which does not mean that there is only one communication bus or one type of communication bus.

The communications interface is configured for communication between the aforementioned electronic device and other devices.

The memory may comprise a random access memory (RAM), or may comprise a non-volatile memory (NVM), for example at least one disk memory. Optionally, the memory may also be at least one storage device located away from the processor described above.

The aforementioned processor may be a general-purpose processor, such as a central processing unit (CPU), a network processor (NP), or the like. It may also be a digital signal processor (DSP), an application specific integrated circuit (ASIC), a field-programmable gate array (FPGA) or other programmable logic device, a discrete gate or transistor logic device, a discrete hardware component.

Another embodiment of the present application further provides a computer-readable storage medium having a computer program stored thereon. The computer program is executed by a processor, so as to cause the processor to perform the method for task scheduling based on deep reinforcement learning described above.

Another embodiment according to the present invention further provides a computer program product with instructions. The instructions are performed by a computer, so as to cause the computer to perform the method for task scheduling based on deep reinforcement learning in the above embodiments.

The aforementioned embodiments may be implemented in whole or in part by software, hardware, firmware, or any combination thereof. When implemented by software, they may be implemented in whole or in part in the form of a computer program product. The computer program product comprises one or more computer instructions. The computer program instructions are loaded and executed on a computer, so as to cause the computer to perform the processes or functions described in accordance with the embodiments of the present invention in whole or in part. The computer may be a general-purpose computer, a dedicated computer, a computer network, or other programmable devices. The computer instructions may be stored in a computer-readable storage medium or may be transmitted from one computer-readable storage medium to another computer-readable storage medium, for example, the computer instructions may be transmitted from a web site, a computer, a server, or a data center to another web site, another computer, another server, or another data center in a wire (such as a coaxial cable, an optical fiber, a digital subscriber line (DSL)) or wireless (such as infrared, wireless, microwave, etc.) manner. The computer-readable storage medium may be any available medium that may be accessed by a computer or a data storage device such as a server or a data center containing one or more available media. The available media may be magnetic media (such as floppy disks, hard disks, magnetic tapes), optical media (such as DVDs), or semiconductor media (such as solid state disk (SSD)), etc.

The above embodiments are only preferred embodiments of the present application, and are not intended to limit the present application. Any modifications, alternatives, improvements, or the like within the spirit and principle of the present application shall be comprised within the scope of protection of the present application.

What is claimed is:

1. A method for task scheduling based on deep reinforcement learning, comprising:
    obtaining multiple target subtasks to be scheduled; wherein, the multiple target subtasks are subtasks obtained by performing subtask division processing on a target task, which is a to-be-executed data processing task for a target vehicle;
    building target state data corresponding to the multiple target subtasks, wherein the target state data comprises a first set, a second set, a third set, and a fourth set;
    the first set represents the number of CPUs required when each of the target subtasks is executed, the second set represents a data amount and storage location of data required when each of the target subtasks is executed, the third set represents current remaining execution time of an assigned task in each of target nodes, and the fourth set represents a CPU clock frequency of each of the target nodes; the target nodes are nodes for executing the target task in Internet of Vehicles;
    inputting the target state data into a pre-trained task scheduling model, to obtain a scheduling result of each of the target subtasks; wherein, the scheduling result of each of the target subtasks comprises a probability that the target subtask is scheduled to each of the target nodes; and
    for each of the target subtasks, determining a target node to which the target subtask is to be scheduled based on the scheduling result of the target subtask, and scheduling the target subtask to the determined target node;
    wherein, the task scheduling model is a model obtained by training a preset deep neural network through training samples; the training samples comprise sample state data and decision actions corresponding to multiple sample subtasks; the multiple sample subtasks are subtasks obtained by performing the subtask division processing on a sample task related to vehicles which have been executed; each of the decision actions is an action corresponding to each of the sample subtasks during execution; the action corresponding to each of the sample subtasks is to schedule this sample subtask to a sample node, which is a node for executing the sample task in the Internet of Vehicles,
    wherein the deep neural network is a network using an Asynchronous Advantage Actor-Critic (A3C) algorithm;
    a process of training the task scheduling model comprises:
    acquiring actual scheduling data about the sample task when the sample task is executed at multiple target moments;
    assigning values to a preset state space s and a preset action space a based on the acquired actual scheduling data, to obtain sample state data $S_t$ and decision actions at corresponding to the multiple sample subtasks of the sample task at each of the target moments;
    training the deep neural network by at least using the sample state data $S_t$, the decision actions at, a preset reward function and a preset loss function, to obtain the task scheduling model;
    wherein, the state space $S=\{F_{task}, L, T, F_{node}\}$; $F_{task}$, L, T and $F_{node}$ are all sets; $F_{task}$ represents the number of CPUs required when each of the sample subtasks is executed, L represents a data amount and storage location of data required when each of the sample subtasks is executed, T represents remaining execution time of an assigned task in each of sample nodes, and $F_{node}$ represents a CPU clock frequency of each of the sample nodes; the action space a is a set comprising decision actions corresponding to the multiple sample subtasks;
    wherein, the reward function is a function for setting a reward to minimize average execution time; the loss function is a function for calculating a sum of a first type of loss and a second type of loss; the first type of loss is an average loss of Actor networks, and the second type of loss is a loss of a Critic network,
    wherein the deep neural network comprises an input layer, a shared sub-network and an output sub-network that are connected in series;
    wherein, the sample state data is input into the input layer; the shared sub-network comprises multiple fully connected layers connected in series;
    the output sub-network comprises multiple first branch sub-networks and one second branch sub-network which are parallel sub-networks; each of the first branch sub-networks is used as one Actor network to predict a scheduling result of one sample subtask, and the second branch sub-network is used as a Critic network to calculate a reward value of the sample state data; and each of the first branch sub-networks comprises at least one fully connected layer and one softmax output layer, and the second branch sub-network comprises at least one fully connected layer and one linear output layer, wherein the loss function is:

$$L(\theta_1, \theta_2, \ldots, \theta_i, \ldots, \theta_M, \theta_v) = (\Sigma_{i=1}^{M} L_{actor}(\theta_i))/M + L_{critic}(\theta_v)$$

wherein, $L(\theta_1, \theta_2, \ldots, \theta_i, \ldots, \theta_M, \theta_v)$ is a loss value of the deep neural network, M is the number of first branch sub-networks to be trained, $\theta_1, \theta_2, \ldots, \theta_i, \ldots, \theta_M$ are network parameters of M first branch sub-networks, $\theta_i$ is a network parameter of the i-th first branch sub-network, and $\theta_v$ is a network parameter of the second branch sub-network;

wherein $L_{actor}(\theta_i)$ is a loss function of the i-th first branch sub-network:

$$L_{actor}(\theta_i) = \log \pi_i(a_{t,i}|s_t; \theta_i)(R_t - V(s_t; \theta_v)) + \beta H(\pi_i(s_t; \theta_i))$$

wherein, $\pi_i(a_{t,i}|s_t; \theta_i)$ is a probability of outputting an action $a_{t,i}$ by the i-th first branch sub-network, $\pi_i(s_t; \theta_i)$ is a probability distribution of outputting actions by the i-th first branch sub-network $H(\pi_i(s_t; \theta_i))$ is an entropy of the probability distribution, $\beta$ is a parameter for controlling an intensity of entropy regularization term, the action $a_{t,i}$ is an action corresponding to the i-th sample subtask in the decision actions $a_t$, and each of the actions outputted by the i-th first branch sub-network is an action of scheduling the i-th sample subtask to each of the sample nodes;

$H(\pi_i(s_t; \theta_i))$ is calculated by a formula:

$$H(\pi_i(s_t; \theta_i)) = -\sum_{j=1}^{N} p(a_{t,i}^j) \log(2, p(a_{t,i}^j))$$

wherein, $p(a_{t,i}^j)$ is a probability of outputting an action j by the i-th first branch sub-network at a moment t; N is the number of the sample nodes; and the action j is an action of scheduling the i-th sample subtask to a sample node j;

$L_{critic}(\theta_v)$ is the loss function of the second branch sub-network:

$$L_{critic}(\theta_v) = (R_t - V(s_t; \theta_v))^2$$

wherein $R_t$ is a cumulative reward of $a_t$, and $V(s_t; \theta_v)$ is a reward value output by the second branch sub-network, $R_t$ is calculated by a formula:

$$R_t = \sum_{k=0}^{\infty} \gamma^k r_{t+k}$$

$\gamma \in [0,1]$ is a preset discount factor, and $r_{t+k}$ is a reward value in the state represented by the sample state data $S_{t+k}$.

2. The method of claim 1, wherein the reward function is:

$$r_t = T_{base} - T_{job}(s_t, a_t)$$

wherein, $r_t$ is a reward value in a state represented by the sample state data $S_t$, $T_{base}$ is a baseline of preset task execution time, and $T_{job}(S_t, a_t)$ is actual execution time of the sample task when the sample task is scheduled by the decision actions $a_t$ in the state represented by the sample state data $S_t$.

3. An electronic device comprising a processor, a communication interface, a memory and a communication bus, wherein the processor, the communication interface and the memory communicate with each other via the communication bus;

the memory is configured for storing a computer program;

the processor is configured for performing a method for task scheduling based on deep reinforcement learning when executing the computer program stored in the memory, which comprises:

obtaining multiple target subtasks to be scheduled; wherein, the multiple target subtasks are subtasks obtained by performing subtask division processing on a target task, which is a to-be-executed data processing task for a target vehicle;

building target state data corresponding to the multiple target subtasks, wherein the target state data comprises a first set, a second set, a third set, and a fourth set; the first set represents the number of CPUs required when each of the target subtasks is executed, the second set represents a data amount and storage location of data required when each of the target subtasks is executed, the third set represents current remaining execution time of an assigned task in each of target nodes, and the fourth set represents a CPU clock frequency of each of the target nodes; the target nodes are nodes for executing the target task in Internet of Vehicles;

inputting the target state data into a pre-trained task scheduling model, to obtain a scheduling result of each of the target subtasks; wherein, the scheduling result of each of the target subtasks comprises a probability that the target subtask is scheduled to each of the target nodes; and for each of the target subtasks, determining a target node to which the target subtask is to be scheduled based on the scheduling result of the target subtask, and scheduling the target subtask to the determined target node;

wherein, the task scheduling model is a model obtained by training a preset deep neural network through training samples; the training samples comprise sample state data and decision actions corresponding to multiple sample subtasks; the multiple sample subtasks are subtasks obtained by performing the subtask division processing on a sample task related to vehicles which has been executed; each of the decision actions is an action corresponding to each of the sample subtasks during execution; the action corresponding to each of the sample subtasks is to schedule this sample subtask to a sample node, which is a node for executing the sample task in the Internet of Vehicles, wherein the deep neural network is a network using an Asynchronous Advantage Actor-Critic (A3C) algorithm;

a process of training the task scheduling model comprises:

acquiring actual scheduling data about the sample task when the sample task is executed at multiple target moments;

assigning values to a preset state space s and a preset action space a based on the acquired actual scheduling data, to obtain sample state data $S_t$ and decision actions a_t corresponding to the multiple sample subtasks of the sample task at each of the target moments;

training the deep neural network by at least using the sample state data $S_t$, the decision actions $a_t$, a preset reward function and a preset loss function, to obtain the task scheduling model;

wherein, the state space $S=\{F_{task}, L, T, F_{node}\}$; $F_{task}$, $L$, $T$ and $F_{node}$ are all sets; $F_{task}$ represents the number of CPUs required when each of the sample subtasks is executed, L represents a data amount and storage location of data required when each of the sample subtasks is executed, T represents remaining execution time of an assigned task in each of sample nodes, and $F_{node}$ represents a CPU clock frequency of each of the sample nodes; the action space a is a set comprising decision actions corresponding to the multiple sample subtasks;

wherein, the reward function is a function for setting a reward to minimize average execution time; the loss function is a function for calculating a sum of a first type of loss and a second type of loss; the first type of loss is an average loss of Actor networks, and the second type of loss is a loss of a Critic network, wherein the deep neural network comprises an input layer, a shared sub-network and an output sub-network that are connected in series;

wherein, the sample state data is input into the input layer;

the shared sub-network comprises multiple fully connected layers connected in series;

the output sub-network comprises multiple first branch sub-networks and one second branch sub-network which are parallel sub-networks; each of the first branch sub-networks is used as one Actor network to predict a scheduling result of one sample subtask, and the second branch sub-network is used as a Critic network to calculate a reward value of the sample state data; and each of the first branch sub-networks comprises at least one fully connected layer and one softmax output layer, and the second branch sub-network comprises at least one fully connected layer and one linear output layer, wherein the loss function is:

$$L(\theta_1,\theta_2,\ldots,\theta_i,\ldots,\theta_M,\theta_v)=(\Sigma_{i=1}^{M}L_{actor}(\theta_i))/M+L_{critic}(\theta_v)$$

wherein, $L(\theta_1, \theta_2, \ldots, \theta_i, \ldots, \theta_M, \theta_v)$ is a loss value of the deep neural network, M is the number of first branch sub-networks to be trained, $\theta_1, \theta_2, \ldots, \theta_i, \ldots, \theta_M$ are network parameters of M first branch sub-networks, $\theta_i$ is a network parameter of the i-th first branch sub-network, and $\theta_v$ is a network parameter of the second branch sub-network;

wherein $L_{actor}(\theta_i)$ is a loss function of the i-th first branch sub-network:

$$L_{actor}(\theta_i)=\log \pi_t(a_{t,i}|s_t;\theta_i)(R_t-V(s_t;\theta_v))+\beta H(\pi_t(s_t;\theta_i))$$

wherein, $\pi_t(a_{t,i}|s_t; \theta_i)$ is a probability of outputting an action $a_{t,i}$ by the i-th first branch sub-network, $\pi_t(s_t; \theta_i)$ is a probability distribution of outputting actions by the i-th first branch sub-network $H(\pi_t(s_t; \theta_i))$ is an entropy of the probability distribution, $\beta$ is a parameter for controlling an intensity of entropy regularization term, the action $a_{t,i}$ is an action corresponding to the i-th sample subtask in the decision actions $a_t$, and each of the actions outputted by the i-th first branch sub-network is an action of scheduling the i-th sample subtask to each of the sample nodes;

$H(\pi_t(s_t; \theta_i))$ is calculated by a formula:

$$H(\pi_i(s_t;\theta_i))=-\sum_{j=1}^{N}p(a_{t,i}^j)\log(2, p(a_{t,i}^j))$$

wherein, $p(a_{t,i}^j)$ is a probability of outputting an action j by the i-th first branch sub-network at a moment t; N is the number of the sample nodes; and the action j is an action of scheduling the i-th sample subtask to a sample node j;

$L_{critic}(\theta_v)$ is the loss function of the second branch sub-network:

$$L_{critic}(\theta_v)=(R_t-V(s_t;\theta_v))^2$$

wherein $R_t$ is a cumulative reward of $a_t$, and $V(s_t; \theta_v)$ is a reward value output by the second branch sub-network, $R_t$ is calculated by a formula:

$$R_t = \sum_{k=0}^{\infty} \gamma^k r_{t+k}$$

$\gamma \in [0,1]$ is a preset discount factor, and $r_{t+k}$ is a reward value in the state represented by the sample state data $S_{t+k}$.

4. The electronic device of claim 3, wherein the reward function is:

$$r_t=T_{base}-T_{job}(S_t,a_t)$$

wherein, $r_t$ is a reward value in a state represented by the sample state data $S_t$, $T_{base}$ is a baseline of preset task execution time, and $T_{job}(S_t, a_t)$ is actual execution time of the sample task when the sample task is scheduled by the decision actions $a_t$ in the state represented by the sample state data $S_t$.

5. A non-transitory computer-readable storage medium having stored therein a computer program, wherein the computer program is executed by a processor, so as to cause the processor to perform the method of claim 1.

\* \* \* \* \*